(12) United States Patent
Wilson et al.

(10) Patent No.: US 7,337,788 B2
(45) Date of Patent: Mar. 4, 2008

(54) COMPOSITIONS USEFUL FOR CLEANING SOLVENT-BASED PAINT FROM PAINT DELIVERY INSTALLATIONS

(75) Inventors: Neil R. Wilson, Lake Orion, MI (US); Bruce H. Goodreau, Romeo, MI (US)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 10/840,137

(22) Filed: May 6, 2004

(65) Prior Publication Data

US 2005/0009718 A1  Jan. 13, 2005

Related U.S. Application Data

(60) Provisional application No. 60/483,097, filed on Jun. 30, 2003.

(51) Int. Cl.
*B08B 9/00* (2006.01)

(52) U.S. Cl. .............. 134/22.1; 134/22.11; 134/22.12; 134/22.13; 134/22.14; 134/22.17; 134/22.18; 134/22.19; 134/26; 134/28; 134/29; 134/36; 134/38; 134/41; 134/42; 510/201; 510/213; 510/407

(58) Field of Classification Search .............. 134/22.1, 134/22.11, 22.12, 22.13, 22.14, 22.17, 22.18, 134/22.19, 26, 28.29, 36.38, 41, 42; 510/201, 510/213, 407
See application file for complete search history.

(56) References Cited

U.S. PATENT DOCUMENTS

| | | | |
|---|---|---|---|
| 3,861,887 A * | 1/1975 | Forney | 95/196 |
| 4,940,491 A * | 7/1990 | Huang et al. | 134/38 |
| 4,948,513 A * | 8/1990 | Mitchell | 210/705 |
| 4,968,447 A | 11/1990 | Dixon et al. | |
| 5,030,290 A * | 7/1991 | Davis | 134/4 |
| 5,130,463 A | 7/1992 | Haubennestel et al. | |
| 5,151,218 A | 9/1992 | Haubennestel et al. | |
| 5,294,352 A * | 3/1994 | Waldmann | 210/725 |
| 5,298,186 A * | 3/1994 | Mitchell et al. | 252/180 |
| 5,443,748 A | 8/1995 | Bergishagen et al. | |
| 5,454,985 A | 10/1995 | Harbin | |
| 5,492,626 A | 2/1996 | Uenoyama et al. | |
| 5,536,439 A * | 7/1996 | Harbin | 510/212 |
| 5,744,437 A | 4/1998 | Rowe et al. | |
| 5,759,975 A | 6/1998 | Maxwell | |
| 5,798,325 A * | 8/1998 | Beleck | 510/201 |
| 6,074,999 A | 6/2000 | Iizuka et al. | |
| 6,111,054 A | 8/2000 | Haubennestel et al. | |
| 6,268,323 B1 | 7/2001 | Honda et al. | |
| 6,294,221 B1 | 9/2001 | May et al. | |
| 6,372,050 B2 | 4/2002 | Honda et al. | |
| 6,475,295 B1 | 11/2002 | Bohnes et al. | |
| 6,517,626 B2 | 2/2003 | Saquet et al. | |
| 2003/0006197 A1* | 1/2003 | Mahoney et al. | 210/725 |
| 2004/0245181 A1* | 12/2004 | Foster | 210/728 |
| 2006/0021947 A1* | 2/2006 | Ennis | 210/725 |

FOREIGN PATENT DOCUMENTS

| | | | |
|---|---|---|---|
| CA | 1114968 A | * | 12/1981 |
| DE | WO02/48045 | * | 6/2002 |

OTHER PUBLICATIONS

Material Safety Data Sheet Disperbyk-111.
Material Safety Data Sheet Disperbyk-180.
Material Safety Data Sheet Disperbyk-140.
Material Safety Data Sheet Disperbyk-116.
Material Safety Data Sheet Disperbyk-184.
Material Safety Data Sheet BYK-P 104.

* cited by examiner

*Primary Examiner*—Sharidan Carrillo
(74) *Attorney, Agent, or Firm*—Stephen D. Harper; Mary K. Cameron

(57) ABSTRACT

Uncured solvent-based paint may be flushed from a paint delivery installation using a substantially non-aqueous composition containing one or more organic solvents and a polymer having acid and/or amine functional groups.

24 Claims, No Drawings

COMPOSITIONS USEFUL FOR CLEANING SOLVENT-BASED PAINT FROM PAINT DELIVERY INSTALLATIONS

This application claims priority from U.S. Provisional Application Ser. No. 60/483,097, filed 30 Jun. 2003 and incorporated herein by reference in its entirety.

FIELD OF THE INVENTION

This invention relates to compositions useful for flushing uncured paint from paint application delivery installations between color change cycles. The compositions are substantially non-aqueous and comprise one or more organic solvents and at least one polymer having acid and/or amine functional groups.

DESCRIPTION OF THE RELATED ART

In the mass production of products such as vehicles, paint application delivery installations are commonly used which are capable of being operated so that a number of different paints (varying in color, for example) can be applied sequentially using the same installation. For example, the installation may comprise a spray-coating device and a color exchange device connected to a plurality of paint supply reservoirs containing different color paints. Organic solvents are commonly used to clean uncured paint residues from the paint application delivery installation between color change cycles. During normal operation of a manufacturing site where such equipment is used, many color change cycles may be performed over the course of a day. Depending upon the paint and delivery installation used, certain components of the paint may tend to destabilize and build up on the surfaces of the paint delivery installation. The deposited paint components are often quite difficult to remove using organic solvents alone. If not removed between color change cycles, the deposited paint components continue to accumulate. Eventually, small portions of the deposited paint components break free from the installation surfaces and contaminate the fresh paint being applied using the installation, resulting in defects in the paint finish.

SUMMARY OF THE INVENTION

It has now been found that removal of uncured paint residues from paint delivery installations can be significantly enhanced and the build-up of uncured paint residue in such installations can be reduced by incorporating one or more functionalized organic polymers in the organic solvent or mixture of organic solvents used to flush such equipment. The present invention provides a method of painting substrates with frequent changes between different paints wherein said paints are delivered via a paint delivery installation, said method comprising flushing said paint delivery installation between each change of paint with the aforementioned compositions containing solvent and functionalized polymer.

DETAILED DESCRIPTION OF CERTAIN EMBODIMENTS OF THE INVENTION

Without wishing to be bound by theory, it is believed that the polymer may act as a stabilizer or dispersant with respect to the pigment and inorganic rheology modifiers (e.g., amorphous silica) present in the uncured paint residues that tend to deposit on the paint delivery equipment surfaces over time. The functional groups on the polymer may be acid groups (or salts thereof) or amine groups (or salts thereof). Suitable acid groups include carboxylic acid groups (e.g., —$CO_2$H) as well as phosphoric acid groups (e.g., —P(O)(OH)$_2$). The amine groups may be primary, secondary, and/or tertiary in structure. The polymer may also contain both acid groups (and/or salts thereof) and amine groups (and/or salts thereof). Preferably, the polymer contains a plurality of functional groups (e.g., at least three functional groups per molecule) and has a number average molecular weight of at least about 500. The polymer should be selected so that it is sufficiently soluble in the organic solvent(s) used to improve the ability of the solvent(s) to remove uncured paint residues (especially where such uncured paint has built up as a surface film) from paint delivery equipment. The optimum concentration of polymer in the organic solvent(s) will vary depending upon the structure of the polymer, the composition of the paint residues being removed, and other factors, but may be determined by routine experimentation. Typically, the composition used to clean paint residues will contain from about 0.1 to about 5 weight percent (preferably, about 0.2 to about 3 weight percent) of the polymer or mixture of polymers.

Functionalized polymers suitable for use in the present invention may be synthesized by any of the methods known in the art for preparing polymeric substances containing acid and/or amine groups. For example, carboxylic acid groups may be introduced into the polymer using one or more ethylenically unsaturated monomers bearing carboxylic acid groups such as acrylic acid, methacrylic acid, maleic acid, itaconic acid, fumaric acid, citraconic acid, and the like. Amine groups may be introduced by means of one or more ethylenically unsaturated monomers bearing amine groups such as tertiary amine functional acrylate and methacrylate monomers (e.g., N,N-dimethylaminoethyl acrylate, N,N-dimethylaminoethyl methacrylate, N,N-diethylaminoethyl acrylate, N,N-diethylaminoethyl methacrylate, N-t-butylaminoethyl methacrylate, 2-N-morpholinoethyl acrylate, 2-N-morpholinoethyl methacrylate), amine-substituted styrenes, and vinyl pyridines. Ethylenically unsaturated phosphonic acids such as vinyl phosphonic acid can be polymerized to provide polymers bearing phosphoric acid groups. These functionalized ethylenically unsaturated monomers may be copolymerized with ethylenically unsaturated monomers that do not contain acid or amine groups (e.g., acrylates, methacrylates, vinyl aromatic monomers, olefins). Copolymers useful in the present invention may have block or random structures. A polymer may be reacted or derivatized with a phosphorylation reagent such as polyphosphoric acid, phosphorus pentachloride, or phosphorus pentoxide in order to form phosphoric acid groups on the polymer. The acid functional groups may be in salt form, with alkylammonium and alkanolammonium salts being especially preferred. For certain applications, polymers having relatively high functional group equivalent weights (e.g., greater than about 300 g/mole) may be preferred (functional equivalent weight being calculated by dividing 56100 by the acid or amine value of the polymer). The polymer may be linear or branched in structure. Particularly suitable polymers for use in the present invention include the polymers sold under the DISPERBYK trademark by Byk Chemie, including, for example, DISPERBYK 140 (amine value=76 mg KOH/g; acid value 72 mg KOH/g; amine functional equivalent weight=738 g/mole; acid functional equivalent weight=779 g/mole; 52 wt. % non-volatile matter), DISPERBYK 111 (acid value=129 mg KOH/g; acid functional equivalent weight=435 g/mole; greater than 90 wt. % non-volatile matter), DISPERBYK 184 (amine value=14 mg KOH/g; 52 wt. % non-volatile matter), DISPERBYK 180 (acid value=95 mg KOH/g; amine value=95 mg KOH/g; 79 wt. % non-volatile matter) and DISPERBYK 116 (amine value=65 mg KOH/g; amine functional equivalent weight=863 g/mole; greater than 98 wt. % non-volatile matter).

Suitable organic solvents for use in the present invention include ketones (e.g., acetone, methyl ethyl ketone, methyl isobutyl ketone), esters (e.g., n-butyl acetate, ethyl acetate), ethers, alcohols (e.g., n-butyl alcohol, ethanol, isopropanol), aliphatic hydrocarbons (e.g., heptane, hexane, VM&P naphtha), and aromatic hydrocarbons (e.g., xylene, light aromatic solvent naphtha). Mixtures of different organic solvents may also be used. The composition should be substantially non-aqueous; that is, less than 5 weight % water (preferably, less than 1 weight % water, more preferably less than 0.2 weight % water) should be present. Additionally, the organic solvent(s) selected should be capable of solubilizing the functionalized polymer. In one embodiment of the invention, the composition comprises 30 to 50 weight % ketone (preferably, a $C_3$-$C_5$ ketone such as acetone), 35 to 55 weight % aromatic hydrocarbon (preferably, an aromatic naphtha), 1 to 10 weight % ester (preferably, a $C_2$-$C_5$ alkyl ester of acetic acid or propionic acid such as n-butyl acetate), 5 to 15 weight % alcohol (preferably, a $C_2$-$C_4$ monoalcohol such as isopropyl alcohol), and 0.4 to 3 weight % functionalized polymer. In another embodiment of the invention, the composition comprises 50 to 80 weight % ketone (preferably, a $C_3$-$C_5$ ketone such as acetone), 1 to 15 weight % aromatic hydrocarbon, 1 to 10 weight % ester (preferably, a $C_2$-$C_5$ alkyl ester of acetic acid or propionic acid such as n-butyl acetate), 1 to 20 weight % alcohol (preferably, a $C_2$-$C_4$ monoalcohol such as isopropyl alcohol), 5 to 25 weight % aliphatic hydrocarbon (preferably a $C_5$-$C_{12}$ aliphatic hydrocarbon such as n-heptane) and 0.2 to 3 weight % functionalized polymer. Compositions useful in practicing the present invention may be prepared by adding effective amounts of one or more functionalized polymers to commercially available paint flushing products based on organic solvents such as, for example, PARCOSOL 283, PARCOSOL 304, PARCOSOL 130, PARCOSOL 290, PARCOSOL 302, PARCOSOL 131, PARCOSOL 308, and PARCOSOL 306 (all of which are products sold by the Surface Technologies Division of Henkel Corporation, Madison Heights, Mich.).

EXAMPLES

Example 1

The following is an illustrative example of a composition in accordance with the invention which has been found to be particularly effective in removing uncured solvent-based paint residues from surfaces such as those found in paint delivery equipment and in reducing the build-up of such residues on such surfaces over time:

| | |
|---|---|
| Acetone | 40 wt. % |
| Light Aromatic Naphtha[1] | 44 wt. % |
| n-Butyl Acetate | 5 wt. % |
| Isopropyl Alcohol (Anhydrous) | 10 wt. % |
| DISPERBYK 140 Dispersant[2] | 1 wt. % |

[1]Aromatic 100 Hydrocarbon Fluid, obtained from ExxonMobil Chemical
[2]obtained from Byk Chemie Examples 2-4

An organic solvent mixture is prepared by combining 65 wt. % acetone, 5 wt. % n-butyl acetate, 10 wt. % isopropyl alcohol, 7 wt. % napthalene-depleted Aromatic 150 hydrocarbon fluid (obtained from ExxonMobil Chemical) and 13 wt. % n-heptane. Compositions useful as paint-flushing materials in accordance with the present invention are obtained by combining the organic solvent mixture with 1 vol. % of the following functionalized polymers (all obtained from Byk Chemie): DISPERBYK 111 (Example 2), DISPERBYK 116 (Example 3), or DISPERBYK 140 (Example 4).

Examples 5-7

Acetone was combined with DISPERBYK 111 (obtained from Byk Chemie) to provide paint-flushing compositions useful in the present invention (Example 5: 5 wt. % DISPERBYK 111; Example 6: 2 wt. % DISPERBYK 111; Example 7: 1 wt. % DISPERBYK 111).

Examples 8-9

Acetone was combined with 1 wt. % of either DISPERBYK 116 (Example 8) or DISPERBYK 140 (Example 9) to provide useful paint-flushing compositions.

Examples 10-12

Xylene was combined with 1 wt. % of either DISPERBYK 116 (Example 10), DISPERBYK 111 (Example 11), or DISPERBYK 140 (Example 12) to provide compositions useful in removing uncured solvent-based paint residues from paint delivery installations in accordance with the present invention.

The compositions of the invention are contacted with uncured solvent-based paint present as a residue in the interior of or on a surface of a paint delivery installation such as a surface of a paint line, valve, regulator, color exchange device, pump, tank, or sprayer, for example, for a time and at a temperature effective to loosen and remove the paint residue from the installation. The paint residue may be, for example, a primer, base color paint, or clear coat and may be partially or fully dried. The paint may comprise one or organic resins such as an epoxy resin, polyether resin, polyacrylate resin, polyurethane resin, polyester resin, or melamine resin as well as other components such as solvents, pigments, crosslinking agents or curatives, wetting additives, rheology modifiers, fillers, defoaming additives, pigment dispersants, pigment stabilizers, and the like. The paint removal performance of the compositions described herein is surprisingly quite effective at temperatures around room temperature (e.g., about 40 degrees F. to about 100 degrees F.). Heating the composition above room temperature thus is generally not necessary, although such heating will tend to accelerate the rate at which the paint residue is removed. The time required to remove the paint residue may also be reduced by agitating the composition while in contact with the paint residue, applying the composition at an elevated pressure against the paint residue, or by circulating or pumping the composition through the paint delivery installation being cleaned. The used composition may be recycled or reused if desired, with conventional purification methods known in the art being employed if desired to remove contaminants such as the paint residue components.

What is claimed is:

1. A method for flushing an uncured solvent-based paint from a spray-coating device, said method comprising contacting said uncured solvent-based paint with a composition containing less than about 5 weight percent water and comprising one or more organic solvents and at least one polymer, dissolved in said one or more organic solvents throughout said contacting and having functional groups selected from the group consisting of acid groups, amine groups and combinations and salts thereof for a time and at a temperature effective to disperse and remove said uncured solvent-based paint from said spray-coating device, wherein said composition comprises 30 to 50 weight % ketone, 35 to 55 weight % aromatic hydrocarbon, 1 to 10 weight % ester, 5 to 15 weight % alcohol, and 0.2 to 3 weight % of said polymer.

2. The method of claim 1 wherein the functional groups in at least one polymer are salts of acid groups in the form of alkyl ammonium or alkanol ammonium salts.

3. The method of claim 1 wherein at least one polymer has an acid functional equivalent weight of greater than 300 g/mole.

4. The method of claim 1 wherein said contacting is accomplished by circulating said composition through said spray-coating device.

5. The method of claim 1 wherein said uncured solvent-based paint comprises one or more resins selected from the group consisting epoxy resins, polyether resins, polyacrylate resins, polyurethane resins, polyester resins, and melamine resins.

6. The method of claim 1 wherein said polymer contains at least three functional groups per molecule selected from the group consisting of carboxylic acid groups, salts of carboxylic acid groups, and combinations thereof.

7. The method of claim 1 wherein said polymer contains at least three functional groups per molecule selected from the group consisting of phosphoric acid groups, salts of phosphoric acid groups, and combinations thereof.

8. The method of claim 1 wherein said polymer contains at least three functional groups per molecule selected from the group consisting of amine groups, salts of amine groups, and combinations thereof.

9. The method of claim 1 wherein said polymer has a number average molecular weight of at least 500.

10. The method of claim 1 wherein said polymer contains both at least one acid group or salt thereof and at least one amine group or salt thereof per molecule.

11. A method for flushing an uncured solvent-based paint from a spray-coating device, said method comprising contacting said uncured solvent-based paint with a composition containing less than about 5 weight percent water and comprising one or more organic solvents and at least one polymer, dissolved in said one or more organic solvents throughout said contacting and having functional groups selected from the group consisting of acid groups, amine groups and combinations and salts thereof for a time and at a temperature effective to disperse and remove said uncured solvent-based paint from said spray-coating device, wherein said composition comprises 50 to 80 weight % ketone, 1 to 15 weight % aromatic hydrocarbon, 1 to 10 weight % ester, 1 to 20 weight % alcohol, 5 to 25 weight % aliphatic hydrocarbon, and 0.2 to 3 weight % of said polymer.

12. The method of claim 11 wherein the functional groups in at least one polymer are salts of acid groups in the form of alkyl ammonium or alkanol ammonium salts.

13. The method of claim 11 wherein at least one polymer has an acid functional equivalent weight of greater than 300 g/mole.

14. The method of claim 11 wherein said contacting is accomplished by circulating said composition through said spray-coating device.

15. The method of claim 11 wherein said uncured solvent-based paint comprises one or more resins selected from the group consisting epoxy resins, polyether resins, polyacrylate resins, polyurethane resins, polyester resins, and melamine resins.

16. The method of claim 11 wherein said polymer contains at least three functional groups per molecule selected from the group consisting of carboxylic acid groups, salts of carboxylic acid groups, and combinations thereof.

17. The method of claim 11 wherein said polymer contains at least three functional groups per molecule selected from the group consisting of phosphoric acid groups, salts of phosphoric acid groups, and combinations thereof.

18. The method of claim 11 wherein said polymer contains at least three functional groups per molecule selected from the group consisting of amine groups, salts of amine groups, and combinations thereof.

19. The method of claim 11 wherein said polymer has a number average molecular weight of at least 500.

20. The method of claim 11 wherein said polymer contains both at least one acid group or salt thereof and at least one amine group or salt thereof per molecule.

21. A method for flushing an uncured solvent-based paint from a paint delivery installation, said method comprising contacting said uncured solvent-based paint in or on said paint delivery installation with a composition for a time and at a temperature effective to disperse and remove said uncured solvent-based paint from said paint delivery installation, said composition containing less than about 5 weight percent water and comprising one or more organic solvents and about 0.1 to about 5 weight % of at least one polymer having functional groups selected from the group consisting of acid groups, amine groups and combinations and salts thereof, wherein said at least one polymer is soluble in the organic solvents and acts as a stabilizer or dispersant for pigment in the uncured solvent-based paint, the composition comprising:
   a) 30 to 50 weight % ketone, 35 to 55 weight % aromatic hydrocarbon, 1 to 10 weight % ester, and 5 to 15 weight % alcohol; or
   b) 50 to 80 weight % ketone, 1 to 15 weight % aromatic hydrocarbon, 1 to 10 weight % ester, 1 to 20 weight % alcohol, and 5 to 25 weight % aliphatic hydrocarbon.

22. The method of claim 21, wherein said polymer contains both at least one acid group or salt thereof and at least one amine group or salt thereof per molecule.

23. The method of claim 21, wherein said paint delivery installation is a paint line, valve, regulator, color exchange device, pump, tank or sprayer.

24. The method of claim 22 wherein at least one acid group or salt thereof comprises salts of acid groups in the form of alkyl ammonium or alkanol ammonium salts.

* * * * *